United States Patent [19]

Langhans

[11] Patent Number: 4,912,713
[45] Date of Patent: Mar. 27, 1990

[54] SOLID STATE LASER ROD FOR OPTIMIZING EFFICIENCY AND MINIMIZING WAVE FRONT DISTORTION

[75] Inventor: Lutz Langhans, Starnberg, Fed. Rep. of Germany

[73] Assignee: Carl Baasel Lasertechnik GmbH, Fed. Rep. of Germany

[21] Appl. No.: 223,190

[22] Filed: Jul. 22, 1988

[30] Foreign Application Priority Data

Jul. 29, 1987 [DE] Fed. Rep. of Germany ....... 3725144

[51] Int. Cl.⁴ .............................................. H01S 3/06
[52] U.S. Cl. ........................................ 372/66; 372/71; 372/100
[58] Field of Search ................... 372/66, 33, 108, 100, 372/34, 71

[56] References Cited

U.S. PATENT DOCUMENTS

| | | | |
|---|---|---|---|
| 3,308,395 | 3/1967 | Sorokin | 372/66 |
| 3,530,397 | 9/1970 | Suzuki et al. | 372/66 |
| 3,538,453 | 11/1970 | Miller | 372/66 |
| 3,633,126 | 1/1972 | Martin et al. | 372/106 |
| 3,646,474 | 2/1972 | Segre | 372/66 |
| 4,214,216 | 7/1980 | Jones, Jr. | 331/94.5 C |
| 4,214,716 | 7/1980 | Jadouin | 241/186 R |
| 4,740,983 | 4/1988 | Azad | 372/66 |

FOREIGN PATENT DOCUMENTS 1356934 2/1964 France .
1361121 4/1964 France .

OTHER PUBLICATIONS

E. I. Kamenskii et al., "Lasers with Polyhedral Energy Guides", Soviet Journal of Quantum Electronics, Band 1, Nr. 4, Jan./Feb. 1972, pp. 369-375.
Tanaka et al.; "Laser Operation in a Wedge Shaped Ruby"; Japan J. Appl. Phys. 5; 1966; pp. 258-259.

*Primary Examiner*—Frank Gonzalez
*Attorney, Agent, or Firm*—Andrus, Sceales, Starke & Sawall

[57] ABSTRACT

To alleviate the adverse thermal effects of the pumping power and to increase the efficiency of the laser, a solid state laser rod is formed of a polygonal cross-section having flat, internally reflecting side surfaces extending parallel to the rod axis. A light beam applied to one end surface describes an angluar helical path within the rod to a second end surface. By passing the light beam through diverse areas of the rod, compensation for radial temperature gradients is obtained. A plurality of laser beams may traverse the rod.

9 Claims, 2 Drawing Sheets

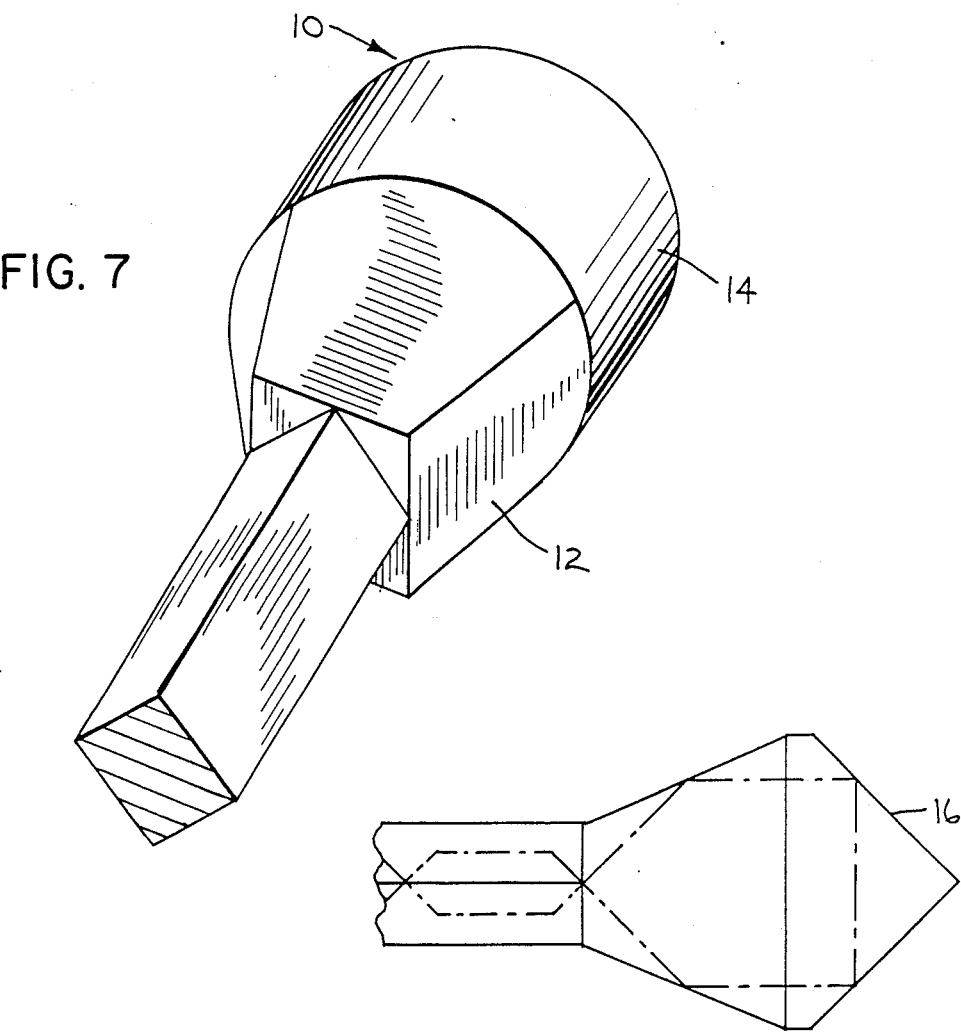
FIG. 7
FIG. 8
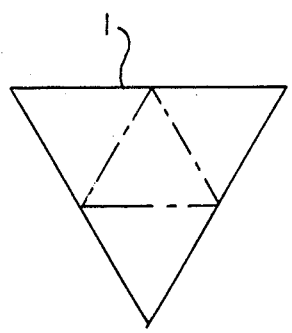
FIG. 9
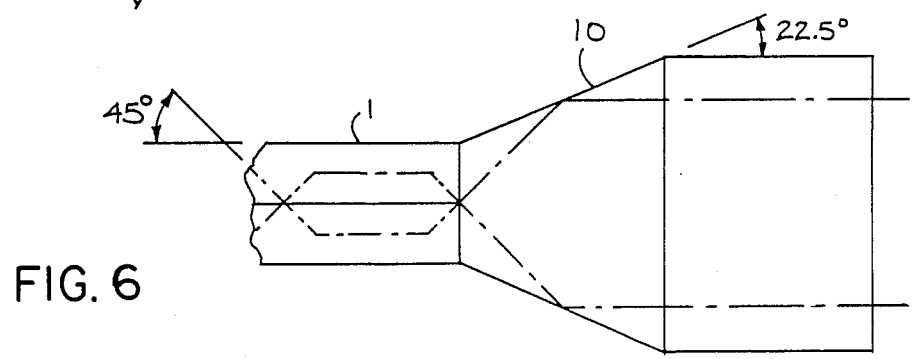
FIG. 6

SOLID STATE LASER ROD FOR OPTIMIZING EFFICIENCY AND MINIMIZING WAVE FRONT DISTORTION

BACKGROUND OF THE INVENTION

1. Field of the Invention

The present invention relates to a solid state laser rod.

2. Description of the Related Art

The lasers mainly used for material processing are gas lasers (CO2) and solid state type lasers (Nd-YAG or Nd glass). CO2 lasers are advantageous in that they allow for greater power (approx. 20 kW are commercially available). Solid state type lasers are characterized in particular by a compact construction, a smaller obtainable focus and a shorter wavelength. Since the wavelength of the solid laser is in the range of very near IR light, glass optics can be used. The disadvantages of solid lasers are the low efficiency of merely 1.5 to 2%, the lower power (about 1000 W are commercially available at present), and the poor beam quality or focusability at higher powers.

Up to now, circular laser rods have normally been used for solid lasers. A circular cross-section of the rod, however, leads to a radial temperature gradient due to the energy supply by optical pumping. Since different temperatures within the rod result in different refraction indices at different points of the rod, a thermal lens forms in the rod. This thermal lens impairs the beam quality (increasing the beam divergence) and becomes so strong, as of a certain pumping power, that a stable resonator is no longer possible.

Various shapes have been proposed for the laser-active solid state body which differ from the usual circular rod shape (e.g. FR-A-1356934 and Soviet Journal of Quantum Electronics 1,4 Jan.-Feb. 72, 369 ff).

In these proposals, the beam is reflected several times in polygonal bodies (partly utilizing the low-loss total reflection on boundary surfaces), thereby obtaining a beam path as long as possible in the laser-active medium. The beam path length is further increased by placing a plurality of such polygonal disks one on top of the other and having the beam pass through these disks successively.

Due to the long beam path, one would thus theoretically expect lasers with high output power. But in the case of optical nonuniformity (variations in the refraction index due to thermal gradients) a longer beam path means a corresponding impairment of beam quality.

Furthermore, the proposed bodies are difficult to realize in terms of their dimensions and the working of their surfaces.

In view of the thermal problems and the resulting optical problems, a laser rod has also been developed with a rectangular cross-section, the so-called "slab laser" (U.S. Pat. No. 3,633,126; U.S. Pat. No. 4,214,216). A light beam is introduced into one end of the slab, which is preferably oriented at a Brewster angle, said light beam being reflected several times within the rod on two opposed, totally reflecting longitudinal sides of the rod before exiting from the other end. With suitable pumping geometry, this results not in a radial temperature gradient as in the rod with a circular cross-section, but in isothermal planes with more favorable heat dissipation. Due to the increased heat dissipation one can obtain a higher laser output. Due to the zigzag path of the light beam within the laser rod, the beam passes through the temperature gradients in the opposite direction. This compensates the effect of the thermal lens on one axis. On the other axis no gradient occurs due to the flat isotherms.

The slab laser therefore allows for higher pumping powers and higher output power with good beam quality, but its efficiency is lower than using a circular rod due to the pumping geometry.

SUMMARY OF THE INVENTION

It is the object of the present invention to provide a rod for a solid state laser which allows for higher pumping powers and therefore higher output power while increasing the efficiency relative to comparable solid lasers, and improving the beam quality.

Whereas, in the known slab laser, the light beam describing a zigzag path defines one plane within the laser rod, the helical light beam path proposed by the invention defines a plurality of planes within the laser rod, depending on the cross-sectional shape of the laser rod. The light admission surface is preferably disposed at a Brewster angle so that light can enter or exit parallel to the axis. The light beam enters the light admission surface at a point from which it is directed to a reflecting longitudinal side surface, to be directed from the impinging point there to a second longitudinal side surface of the rod, and from there to a third longitudinal side surface of the rod and then possibly to further longitudinal side surfaces. The light beam thus forms within the laser rod an angular helix, which becomes increasingly circular the more longitudinal side surfaces there are in the laser rod of polygonal cross-section.

With each rotation, i.e. with each convolution of 360°, the beam is rotated in itself by 720° at a suitable pitch. This rotation causes the optical nonuniformity on the beam path to average out. The undesirable gradients are thus largely compensated without impairing the efficiency by an unfavorable pumping geometry as in the case of the slab laser. Compared to the circular laser rod one can even expect higher efficiency since the beam path in the rod is longer. This is all the more so when the beam passes repeatedly with offset beam paths.

The cross-section of the laser rod can have virtually any shape, provided the beam penetrating the rod describes a helix. However, the cross-section is preferably square, the beam being introduced into the light admission surface in such a way that the convolution described by the beam in the laser rod also has a square cross-section, or it is an equilateral triangle with a helix whose cross-section is an equilateral triangle, regarded in the longitudinal direction. With random triangles, other paths can also occur which are not helical but still three-dimensional.

In principle, a cross-sectional shape with more than four corners is also possible.

The light exit surface can be replaced in a way known as such by a roof prism, so that the beam runs forwards and backwards in the rod.

One can introduce a plurality of light beams at different points on the light admission surface, so that a plurality of helical convolutions occur within the laser rod. Suitable geometry will ensure that the beams do not intersect at any point.

One can also make the beam enter and exit parallel to the axis using suitable end pieces without the Brewster angle. Using such end pieces one can also deflect the beam by using a roof prism so that it passes through the rod again on an offset beam path.

BRIEF DESCRIPTION OF THE DRAWING

Exemplary embodiments of the invention shall be explained in more detail in the following with reference to the drawing, in which

FIG. 6 shows an end piece for deflecting beams so that they exit parallel to the axis, FIG. 7 shows a perspective view of the end piece, FIG. 8 shows an end piece with a roof prism that deflects the beam back into the rod, and FIG. 9 is a cross sectional view of another embodiment of the laser rod.

DESCRIPTION OF THE PREFERRED EMBODIMENTS

Figure 1:
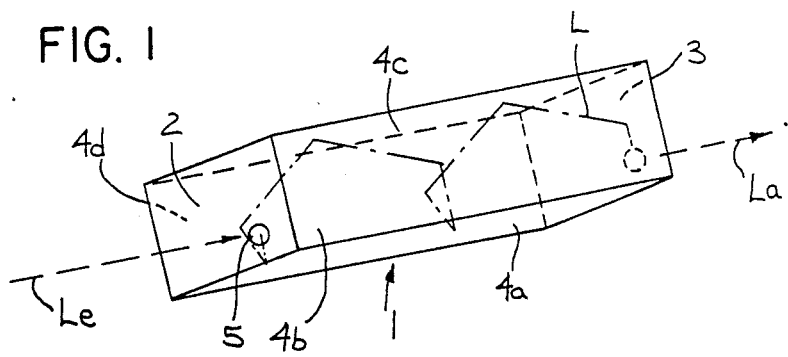
FIG. 1 shows a perspective view of a square laser rod.

The first embodiment of the invention shown in FIG. 1 comprises a solid state type laser rod 1, made of a suitable laser material, with a square cross-section and two ends which form a light admission surface 2 and a light exit surface 3, and four longitudinal side surfaces 4a, 4b, 4c and 4d.

Ends 2 and 3 are disposed at a Brewster angle relative to the longitudinal axis of the rod. Longitudinal side surfaces 4a–4d are designed as totally reflecting surfaces.

A light beam Le parallel to the longitudinal axis of the rod hits a point 5 on light admission surface 2. Within the rod, light beam L is deflected toward side surface 4a shown at the bottom in FIG. 1, reflected there obliquely toward adjacent side surface 4d, reflected by side surface 4d obliquely toward light exit surface 3 against upper side surface 4c, reflected by the side surface 4c obliquely toward light exit surface 3 against upper side surface 4b, and then directed again onto side surface 4a, again obliquely toward light exit surface 3. Thus, light beam L forms within laser rod 1 a three-dimensional curve which can be termed an "angular helical curve."

After light beam L has covered the described path between side surfaces 4a, 4d, 4c, 4b, 4a . . . several times, it hits light exit surface 3 to leave the laser rod as light beam La, due to the Brewster angle of light exit surface 3 relative to the longitudinal axis of the rod. The length of rod 1 is such that the angular helical path has an integral number of turns. In the present case the angular helix has two turns, i.e. after two rotations about the optical axis the beam leaves the rod through the exit surface.

Figure 2:
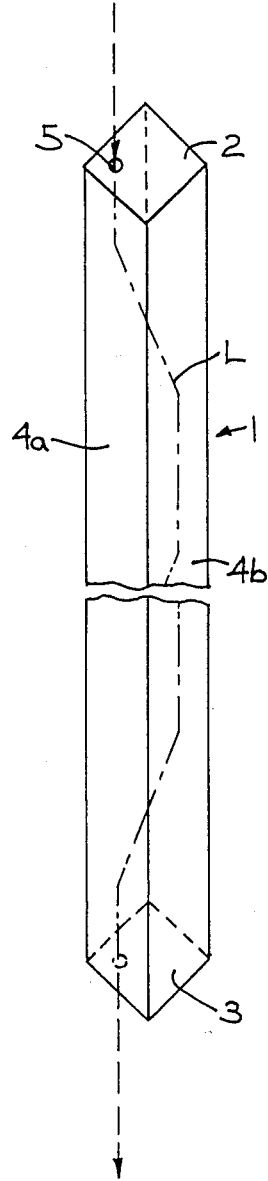
FIG. 2 shows a side view of the laser rod.
Figure 3:
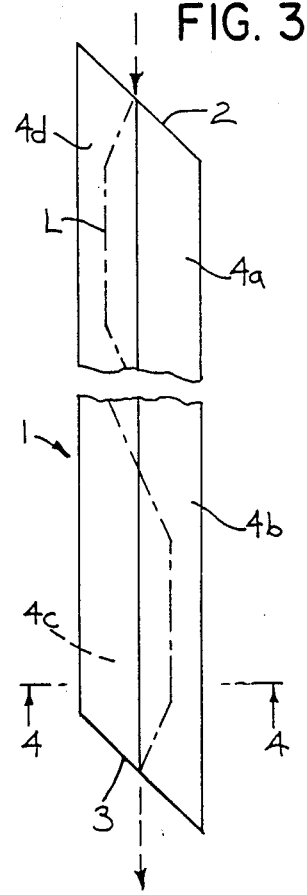
FIG. 3 shows a view of the laser rod according to FIG. 2 from the right.
Figure 5:
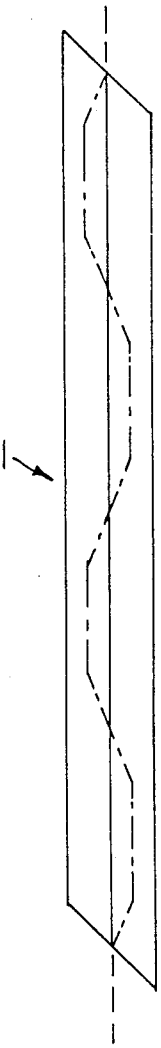
FIG. 5 shows a side view of the total laser rod shown in part in FIGS. 3 and 2.
Figure 4:
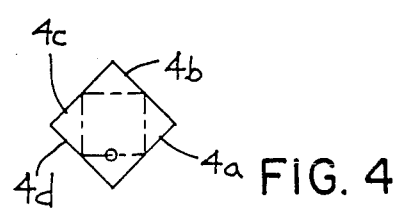
FIG. 4 shows a cross-sectional view along the line IV—IV in FIG. 3.

FIGS. 2 to 4 show the three side views of the laser rod. Laser rod 1 has a square cross-section. Light admission surface 2 and light exit surface 3 are disposed at a Brewster angle relative to the longitudinal axis of the rod. As indicated by FIGS. 2 to 5, light beam L describes an angular, helical, three-dimensional curve within laser rod 1 by being totally reflected at an acute angle to light exit surface 3 on the four side surfaces 4a, 4b, 4c and 4d.

As apparent from FIG. 4, the angular helical curve of light beam L has a square cross-section within laser rod 1, the square being inscribed into the laser rod symmetrically to the two transverse axes of the rod.

The invention is not limited to the two above-described exemplary embodiments. Instead of light exit surface 3, a roof prism can be provided so that the beam runs back within the laser rod. Several separate light beams can also be introduced into surfaces 2 or 3. According to FIG. 2, one could provide a further light admission point opposite light admission point 5, symmetrically to the broken line. Instead of two light beams, four light beams can also be introduced. By introducing two or four beams, one obtains two or four corresponding angular helical paths in the rod which are mutually offset so that the entire volume of the rod is illuminated.

If one wants to direct four light beams through the rod mutually offset and helically, one cannot use the Brewster angle at the end surfaces. If the end surfaces are straight, however, the beams will exit at an angle of, for example, 45° to the axis in four different directions (each offset by 90°). This is unfavorable for incorporation in a water-cooled pump lamp housing.

By using suitable end pieces one can again deflect the beams in the axial direction. FIG. 6 shows such an arrangement. Of the four beams, only two are shown. The two beams exit from the end surface of the rod 1 at 45° and are reflected in the axial direction of the rod on the surfaces of a endpiece 10. FIG. 7 shows the same end piece in a perspective view. As shown in FIGS. 6 and 7, end piece 10 has a truncated pyramidal base 12 connected to rod 1 and a cylindrical trunk 14.

If the beams are not to exit but to run back through the rod, the end piece can be designed as a roof prism 16 (FIG. 8).

I claim:

1. A solid state laser rod suitable for use with a pumping energy source;
   said rod being formed of an active laser material, said rod having an axis, said rod having a first end surface at one end of said axis, said first end surface being oriented such that a light beam applied to said first end surface enters the rod at an angle having a component along the axis, said rod having at least three flat, totally internally reflecting, external side surfaces, said side surfaces extending parallel to said axis and providing a polygonal cross-sectional configuration to said rod in a plane normal to said axis that is defined solely by said external side surfaces, a given side surface receiving the light beam and reflecting same onto another side surface at an angle having a component along said axis so that the light beam travels in an angular, helical, convoluted path within said rod and about said axis; and
   said rod having a second end surface at the other end of said axis from which the light beam can exit said rod;
   the axial length of said rod between said first and second end surfaces being such that the helical light beam path in said rod contains an integral number of turns.

2. A solid state laser rod according to claim 1, characterized in that the rod has a square cross-section.

3. A solid state laser rod according to claim 1, characterized in that the rod has a triangular cross-section.

4. A solid state laser rod according to claim 1, wherein at least said first end surface is oriented with respect to said axis such that a light beam applied to said end surface at a Brewster angle produces the angled, entering light beam in said rod.

5. A solid state laser rod according to claim 1 wherein said first end surface is further defined as suitable for having a plurality of light beams applied thereto and said rod is further defined as having a plurality of helical light beam paths therein.

6. A solid state laser rod according to claim 1 further including an end piece coupled to at least one end surface of said rod, said end piece having reflective means, said end piece permitting the light beam applied to said end piece or exiting said end piece to be aligned parallel to said axis of said rod.

7. A solid state laser rod according to claim 6 wherein said end piece is associated with a light beam deflecting prism.

8. A solid state laser rod according to claim 6 wherein said end piece has a truncated pyramidal portion coupled to a cylindrical portion.

9. A solid state laser rod according to claim 7 wherein said end piece has a truncated pyramidal portion coupled to a cylindrical portion, said end piece being interposed intermediate said rod and said prism.

* * * * *